(12) United States Patent
Emura

(10) Patent No.: US 11,112,555 B2
(45) Date of Patent: Sep. 7, 2021

(54) LIGHT-EMITTING MODULE WITH A PLURALITY OF LIGHT GUIDE PLATES AND A GAP THEREIN

(71) Applicant: NICHIA CORPORATION, Anan (JP)

(72) Inventor: Keiji Emura, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/039,851

(22) Filed: Sep. 30, 2020

(65) Prior Publication Data

US 2021/0096291 A1    Apr. 1, 2021

(30) Foreign Application Priority Data

Sep. 30, 2019  (JP) .............................. JP2019-179846
Sep. 16, 2020  (JP) .............................. JP2020-155192

(51) Int. Cl.
| | |
|---|---|
| *F21V 8/00* | (2006.01) |
| *F21S 2/00* | (2016.01) |
| *G02F 1/13357* | (2006.01) |
| *G02F 1/1335* | (2006.01) |

(52) U.S. Cl.
CPC ............ *G02B 6/0055* (2013.01); *F21S 2/005* (2013.01); *G02B 6/0078* (2013.01); *G02B 6/0091* (2013.01); *G02F 1/133603* (2013.01); *G02F 1/133613* (2021.01); *G02B 6/0036* (2013.01); *G02F 1/133614* (2021.01)

(58) Field of Classification Search
CPC ..... F21S 2/005; G02B 6/0078; G02B 6/0091; G02F 1/133603; G02F 1/133613
See application file for complete search history.

(56) References Cited

U.S. PATENT DOCUMENTS

| | | | |
|---|---|---|---|
| 5,576,578 | A | 11/1996 | Fuhrer et al. |
| 5,703,894 | A | 12/1997 | Valster et al. |
| 5,859,496 | A | 1/1999 | Murazaki et al. |
| 5,998,925 | A | 12/1999 | Shimizu et al. |
| 6,106,093 | A | 8/2000 | Nagoshi et al. |
| 6,163,072 | A | 12/2000 | Tatoh |
| 6,924,596 | B2 | 8/2005 | Sato et al. |

(Continued)

FOREIGN PATENT DOCUMENTS

| | | |
|---|---|---|
| CN | 1148729 A | 4/1997 |
| CN | 2717023 Y | 8/2005 |

(Continued)

*Primary Examiner* — Keith G. Delahoussaye
(74) *Attorney, Agent, or Firm* — Hunton Andrews Kurth LLP

(57) ABSTRACT

A light-emitting module includes a plurality of light guide plates, each of the plurality of light guide plates including a first surface, a side surface, and a second surface opposite to the first surface, the plurality of light guide plates being separated by a gap between the side surfaces; and n light-emitting devices (n being a natural number of 2 or more) provided at the second surface side of the light guide plate for each of the plurality of light guide plates. The n light-emitting devices are disposed respectively in n regions into which the light guide plate is subdivided when viewed from the first surface side. A light-emitting device of the plurality of light guide plates disposed in a region of the n regions adjacent to the gap is shifted toward the gap from a center of the region adjacent to the gap.

6 Claims, 6 Drawing Sheets

(56) References Cited

U.S. PATENT DOCUMENTS

| | | | |
|---|---|---|---|
| 7,641,352 B2* | 1/2010 | Lin | G02F 1/133603 362/97.3 |
| 2001/0001207 A1 | 5/2001 | Shimizu et al. | |
| 2004/0051111 A1 | 3/2004 | Ota et al. | |
| 2004/0159836 A1 | 8/2004 | Sugimoto et al. | |
| 2005/0265029 A1* | 12/2005 | Epstein | G09F 9/3026 362/339 |
| 2007/0243994 A1 | 10/2007 | Sakamoto | |
| 2007/0246841 A1 | 10/2007 | Yamamoto et al. | |
| 2010/0265432 A1* | 10/2010 | Masuda | G02B 6/0051 349/62 |
| 2011/0050558 A1* | 3/2011 | Park | G02F 1/133603 345/102 |
| 2011/0175127 A1 | 7/2011 | Kanada et al. | |
| 2014/0197528 A1 | 7/2014 | Nagata | |
| 2015/0287261 A1 | 10/2015 | Pinchen et al. | |
| 2016/0035943 A1 | 2/2016 | Kao | |

FOREIGN PATENT DOCUMENTS

| | | |
|---|---|---|
| CN | 1240144 C | 2/2006 |
| CN | 101045639 A | 10/2007 |
| CN | 101060103 A | 10/2007 |
| CN | 100382349 C | 4/2008 |
| CN | 201820793 U | 5/2011 |
| EP | 622858 A1 | 11/1994 |
| EP | 952617 A1 | 10/1999 |
| EP | 1352431 A1 | 10/2003 |
| JP | S63000851 A | 1/1988 |
| JP | S63001747 A | 1/1988 |
| JP | S63017250 A | 1/1988 |
| JP | S63124483 A | 5/1988 |
| JP | H08000220 A | 1/1996 |
| JP | H08000653 A | 1/1996 |
| JP | H08001962 A | 1/1996 |
| JP | H08050003 A | 2/1996 |
| JP | H09506478 A | 6/1997 |
| JP | H11040689 A | 2/1999 |
| JP | 2606869 Y2 | 1/2001 |
| JP | 2008103301 A | 5/2008 |
| JP | 3202091 U | 1/2016 |
| JP | 5838309 B2 | 1/2016 |
| JP | 2016006033 A | 1/2016 |
| JP | 2016500181 A | 1/2016 |
| KR | 20090117419 A | 11/2009 |
| WO | 2010013396 A1 | 2/2010 |
| WO | 2013027669 A1 | 2/2013 |
| WO | 2016002883 A1 | 1/2016 |

* cited by examiner

LIGHT-EMITTING MODULE WITH A PLURALITY OF LIGHT GUIDE PLATES AND A GAP THEREIN

CROSS-REFERENCE TO RELATED APPLICATIONS

This application claims priority to Japanese Patent Application No. 2019-179846, filed on Sep. 30, 2019, and Japanese Patent Application No. 2020-155192, filed on Sep. 16, 2020, the disclosure of which is hereby incorporated by reference in its entirety.

BACKGROUND

The invention relates to a light-emitting module.

A light-emitting module in which a light guide plate is combined with a light-emitting element such as an LED (Light Emitting Diode) or the like is widely utilized as a surface light source such as, for example, the backlight of a liquid crystal display or the like. For example, JP-A 2008-103301 (Kokai) discusses a backlight device that is applicable even to a display device having a large screen by arranging multiple mutually-adjacent unit backlight portions in a plane. The backlight device of JP-A 2008-103301 (Kokai) is a sidelight-type in which LED elements are disposed at the end portions of the light guide plates, and has a configuration in which LED element columns are mounted on a circuit board at a boundary portion between the light guide plates of adjacent unit backlight portions.

SUMMARY

When multiple light guide plates are separated by a gap in a non-sidelight-type configuration, the existence of the gap between the light guide plates may cause a dark portion to occur, and an uneven luminance may occur in the light-emitting surface.

A light-emitting module according to an embodiment of the present disclosure can reduce uneven luminance.

In an embodiment of the present disclosure, a light-emitting module includes a plurality of light guide plates, each of the plurality of light guide plates including a first surface, a side surface, and a second surface opposite to the first surface, the plurality of light guide plates being separated by a gap between the side surfaces; and n light-emitting devices provided at a second surface side of the light guide plate for each of the plurality of light guide plates, n being a natural number of 2 or more. The n light-emitting devices are disposed respectively in n regions into which the light guide plate is subdivided when viewed from a first surface side. A light-emitting device of the plurality of light guide plates disposed in a region of the n regions adjacent to the gap is shifted toward the gap from a center of the region adjacent to the gap.

According to the present disclosure, a light-emitting module can reduce uneven luminance.

DETAILED DESCRIPTION OF EMBODIMENTS

Figure 1:
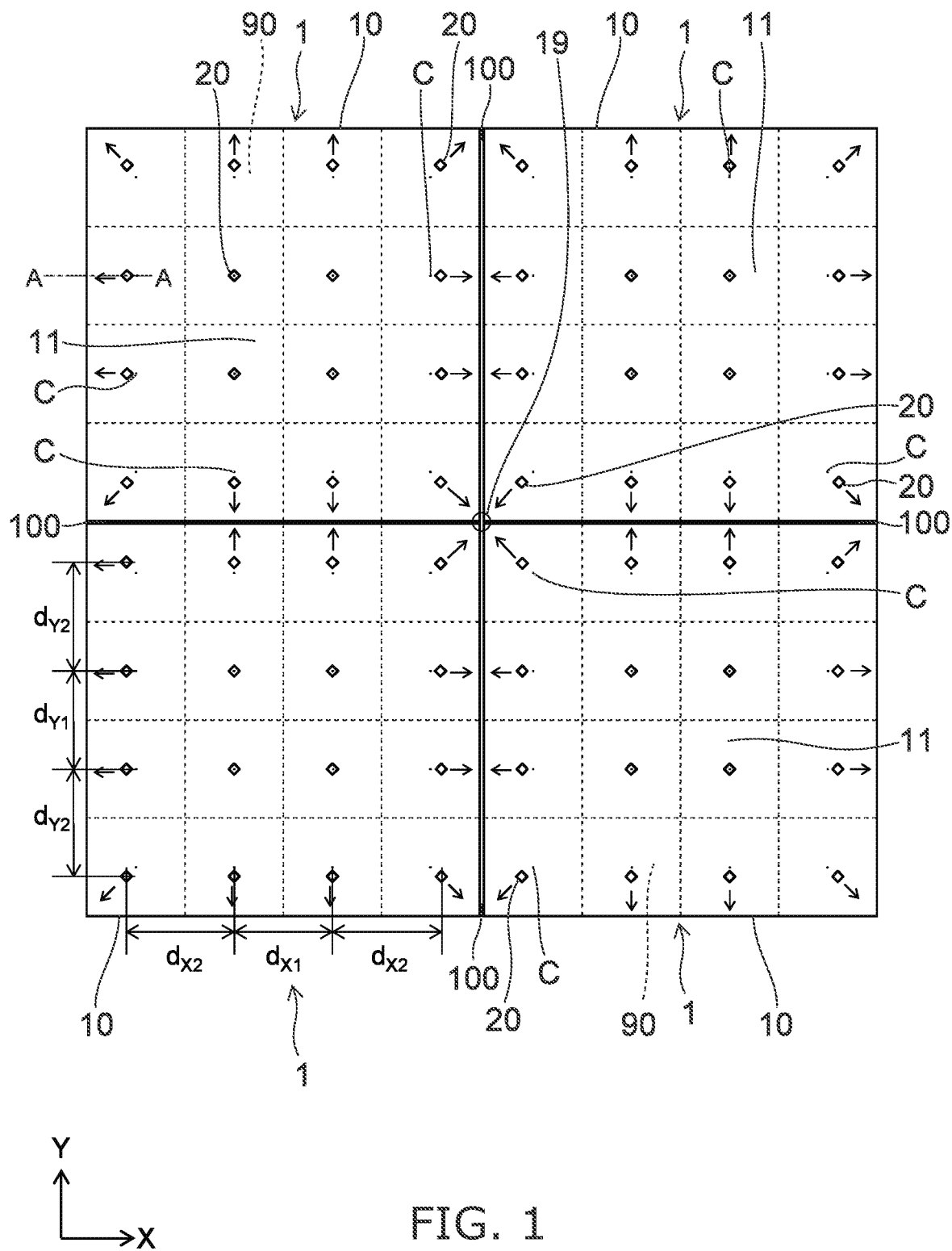
FIG. 1 is a schematic plan view of a light-emitting module of an embodiment of the present disclosure.

Embodiments will now be described with reference to the drawings. The same components in the drawings are marked with the same reference numerals.

FIG. 1 is a schematic plan view of a light-emitting module of an embodiment of the present disclosure. In FIG. 1, two mutually-orthogonal directions are taken as a first direction X and a second direction Y.

The light-emitting module of the embodiment includes multiple light-emitting segments 1. The multiple light-emitting segments 1 are arranged in the XY plane. For example, FIG. 1 shows four light-emitting segments 1 arranged in a lattice configuration along the first direction X and the second direction Y.

Figure 2:
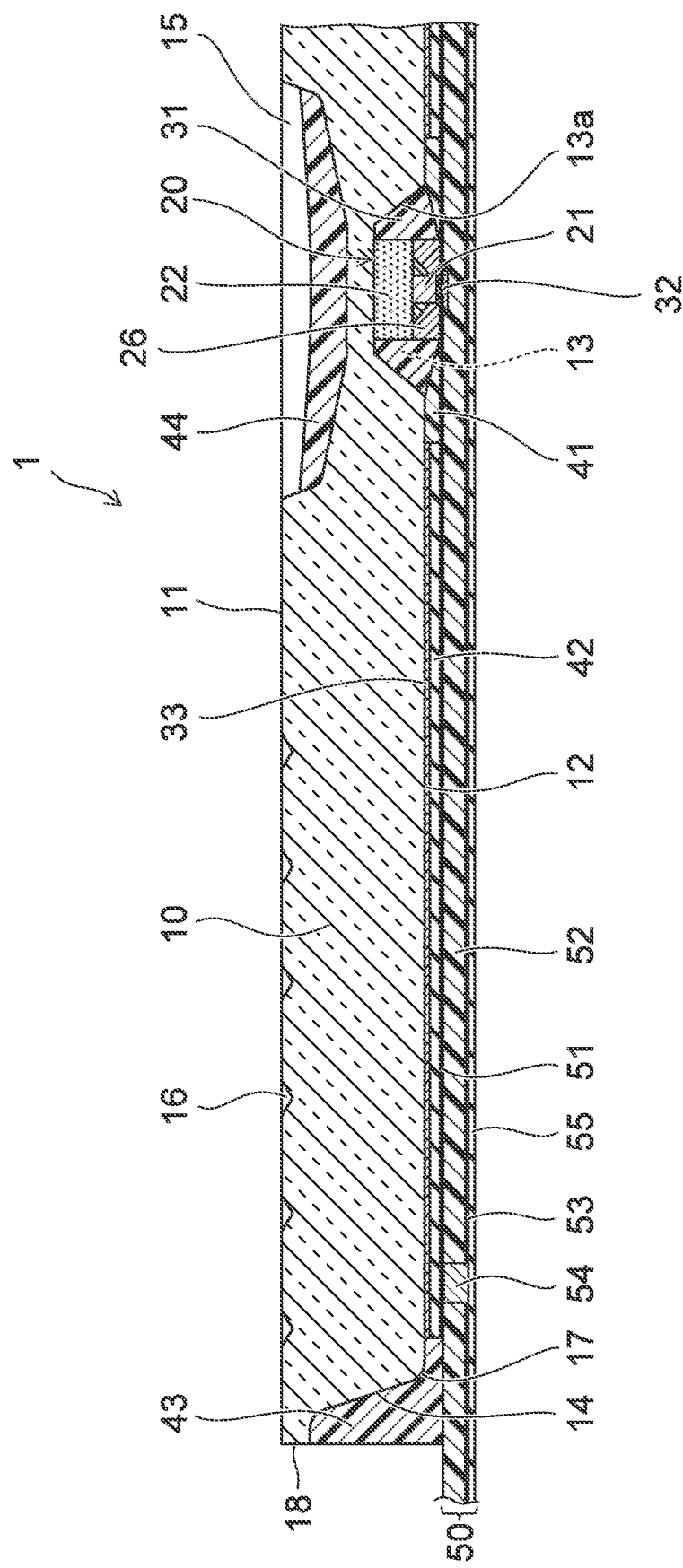
FIG. 2 is an enlarged cross-sectional view along line A-A of FIG. 1.

FIG. 2 is an enlarged cross-sectional view along line A-A of FIG. 1.

Each of the light-emitting segments 1 includes one light guide plate 10 and n light-emitting devices 20 (n being a natural number of 2 or more). Hereinbelow, the n light-emitting devices 20 may be called simply the multiple light-emitting devices 20.

The light-emitting device 20 includes a light-emitting element 21 and a transparent member 22. The transparent member 22 includes, for example, a fluorescer. The light guide plate 10 is transmissive to the light emitted by the light-emitting device 20. In the specification, the light emitted by the light-emitting device 20 refers to the light emitted by the light-emitting element 21 and the light emitted by a fluorescer included in the transparent member 22. When the light-emitting device 20 does not include a fluorescer, the light emitted by the light-emitting device 20 refers to the light emitted by the light-emitting element 21.

For example, a thermoplastic resin such as acrylic, polycarbonate, cyclic polyolefin, polyethylene terephthalate, polyester, or the like, a thermosetting resin such as epoxy, silicone, or the like, glass, etc., may be used as the material of the light guide plate 10.

The light guide plate 10 includes a first surface 11, which is the light-emitting surface of the light-emitting segment 1, and a second surface 12 at the side opposite to the first surface 11. The light guide plate 10 also has a recess 13 at the second surface 12 side. The light-emitting device 20 is disposed in the recess 13.

Figure 3:
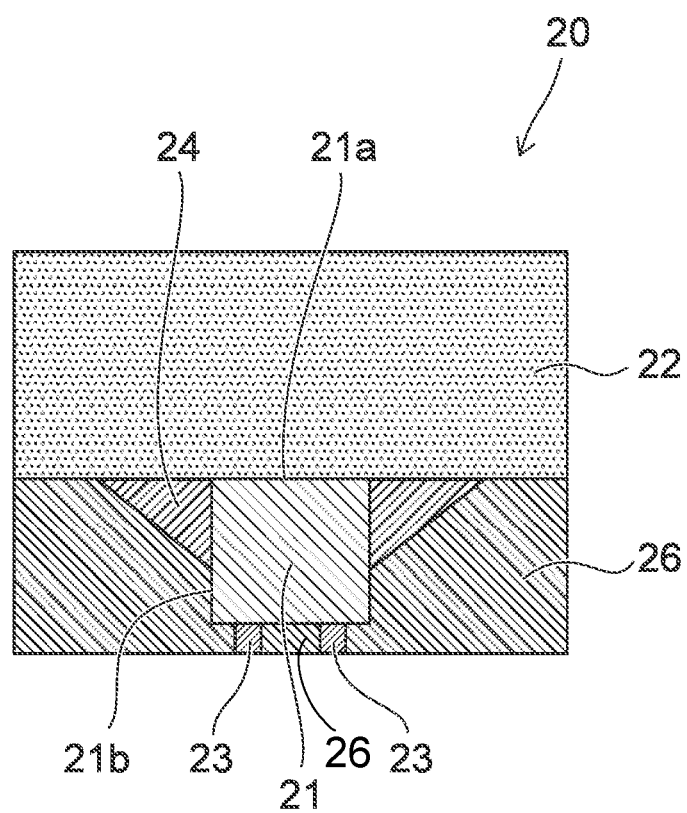
FIG. 3 is a schematic cross-sectional view of a light-emitting device of the embodiment of the present disclosure.

FIG. 3 is a schematic cross-sectional view of the light-emitting device 20.

The light-emitting device 20 includes the light-emitting element 21. The light-emitting element 21 may have a semiconductor stacked structure. As the semiconductor stacked structure, for example, the light-emitting element 21 may include $In_xAl_yGa_{1-x-y}N$ ($0 \leq x$, $0 \leq y$, and $x+y \leq 1$) and may emit blue light. The light-emitting element 21 may include an element emitting light other than blue. Also, light-emitting elements 21 that emit light of different colors may be used as the light-emitting elements 21 included in multiple light-emitting devices 20.

The transparent member 22 is provided on a major light-emitting surface 21a of the light-emitting element 21. The light-emitting element 21 is bonded to the transparent member 22 by a transparent bonding member 24. The transparent member 22 covers the major light-emitting surface 21a of the light-emitting element 21 and spreads into a region that is further outward than a side surface 21b of the light-emitting element 21.

For example, a silicone resin, an epoxy resin, glass, etc., may be used as the material of the transparent member 22. For example, the transparent member 22 is a fluorescer layer, and a fluorescer is dispersed in the transparent member 22. The fluorescer is excited by the light emitted by the light-emitting element 21 and emits light of a wavelength different from the wavelength of the light emitted by the light-emitting element 21. For example, a fluoride-based fluorescer such as a YAG fluorescer, a β-sialon fluorescer, a KSF-based fluorescer, a MGF-based fluorescer, or the like, a nitride fluorescer, etc., may be used as the fluorescer. The transparent member 22 may include multiple types of fluorescers. Also, the multiple fluorescer layers described above may be stacked.

A pair of positive and negative electrodes 23 is provided at the side opposite to the major light-emitting surface 21a of the light-emitting element 21. The side surface 21b of the light-emitting element 21 is covered with a light-reflecting member 26. The light-reflecting member 26 is provided also at the lower surface of the light-emitting element 21 so that the surfaces (FIGS. 2 and 3, the lower surfaces) of the pair of electrodes 23 at the lower surface of the light-emitting element 21 are exposed.

As shown in FIG. 2, the bottom of the light-emitting element 21 is positioned more proximate to and facing the second surface 12 than the transparent member 22, and the top of the transparent member 22 is positioned facing the first surface 11 and more proximate to the first surface 11 than the light-emitting element 21.

A light-transmissive member 31 is provided between a sidewall 13a of the recess 13 in which the light-emitting device 20 is disposed and the side surface of the light-emitting device 20 (the side surface of the transparent member 22 and the side surface of the light-reflecting member 26). The light-emitting device 20 is fixed to the light guide plate 10 by the light-transmissive member 31. Multiple light-emitting devices 20 are fixed to one light guide plate 10.

The light-transmissive member 31 is transmissive to the light emitted by the light-emitting device 20 and may include, for example, the same resin as the material of the light guide plate 10 or a resin having a small refractive index difference with the material of the light guide plate 10.

It is favorable for a space such as an air layer or the like not to be formed between the light-transmissive member 31 and the side surface of the light-emitting device 20 or between the light-transmissive member 31 and the sidewall 13a of the recess 13. Because an air layer is not interposed between the light guide plate 10 and the side surface of the transparent member 22 of the light-emitting device 20, compared to when an air layer is interposed, the refractive index difference between the transparent member 22 and the light guide plate 10 can be smaller, and the input efficiency of the light from the transparent member 22 to the light guide plate 10 can be increased.

A recess 15 is formed at the first surface 11 side in a portion of the light guide plate 10 facing the light-emitting device 20; and a light-reflecting member 44 is provided in the recess 15. The size of the recess 15 when viewed in plan is greater than the size, when viewed in plan, of the recess 13 at the second surface 12 side where the light-emitting device 20 is disposed. In the specification, "when viewed in plan" refers to a plan view from the first surface 11 side, which is the light-emitting surface of the light-emitting segment 1.

A light-reflecting member 41 is provided at the periphery of the light-emitting device 20 at the second surface 12 side of the light guide plate 10. The light-reflecting member 41 is provided below the light-transmissive member 31 and at the side surface of the light-reflecting member 26 but is not provided at the side surface of the fluorescer-including transparent member 22. The side surface of the transparent member 22 is covered with the light-transmissive member 31. The light-reflecting member 41 is provided at the second surface 12 at the periphery of the recess 13.

A light-reflecting member 42 is provided outward of the light-reflecting member 41 at the second surface 12 of the light guide plate 10. The light-reflecting member 42 is adhered to the second surface 12 by a bonding layer 33. The bonding layer 33 is transmissive to the light emitted by the light-emitting device 20 and is, for example, a resin layer.

The light guide plate 10 includes a tilted side surface 14 that is tilted with respect to the first and second surfaces 11 and 12. For example, the tilted side surface 14 and the second surface 12 are continuous and form an obtuse angle. A light-reflecting member 43 is provided at the tilted side surface 14. The light-reflecting member 43 is provided also at a portion of the second surface 12 to cover the corner between the tilted side surface 14 and the second surface 12.

The light guide plate 10 also includes an outermost side surface 18 positioned further outward than the tilted side surface 14. The outermost side surface 18 is not covered with the light-reflecting member 43 and is exposed externally from the light-emitting segment 1.

The light-reflecting member 42 is provided at the second surface 12 between the light-reflecting member 43, which is provided at the end portion of the light-emitting segment 1, and the light-reflecting member 41, which is provided at the periphery of the light-emitting device 20. Also, the light-reflecting member 42 is provided at the second surface 12 between the light-reflecting members 41 between the multiple light-emitting devices 20. The boundary between the light-reflecting member 41 and the light-reflecting member 42 is at a position overlapping the light-reflecting member 44 in the thickness direction of the light guide plate 10.

Wiring 51 is provided at the lower surface of the light-reflecting member 42, the lower surface of the light-reflecting member 41, and the lower surface of the light-reflecting member 26. The wiring 51 is connected to the electrodes 23 of the light-emitting element 21. Separate wiring 51 is provided for the pair of electrodes 23.

A wiring board 50 is bonded to the wiring 51. The wiring board 50 is, for example, a flexible wiring substrate. The wiring board 50 includes a base 52, wiring 53, and a conductive via 54. The insulative base 52 is provided between the wiring 51 and the wiring 53. The base 52 is adhered also to the lower surface of the light-reflecting member 43.

The conductive via 54 extends through the base 52 and connects the wiring 51 and the wiring 53. An insulating film 55 is provided at the surface of the wiring 53.

A recess 16 is formed in a region of the first surface 11 of the light guide plate 10 facing the light-reflecting member 42. Or, a protrusion may be formed in the first surface 11 of the light guide plate 10. For example, the recess 16 (or the protrusion) is formed in a concentric circular configuration at the periphery of the recess 15 facing the light-emitting device 20. Or, the recess 16 (or the protrusion) may be formed in a dot configuration. The recess 16 (or the protrusion) functions as a prism that refracts and/or reflects the light.

The light-reflecting member 41, the light-reflecting member 43, the light-reflecting member 44, and the light-reflecting member 26 are, for example, white resin members including light-diffusing materials. The light-reflecting member 41, the light-reflecting member 43, the light-reflecting member 44, and the light-reflecting member 26 are, for example, members of a silicone resin or an epoxy resin including titanium oxide as the light-diffusing material.

The light-reflecting member 42 includes, for example, a stacked film of multiple insulating films. For example, a polyester resin may be used as the insulating film. In certain embodiments, the light-reflecting member 42 does not include a light-diffusing material. Or, the content ratio of the light-diffusing material in the light-reflecting member 42 may be less than the content ratios of the light-diffusing materials in the light-reflecting member 41, the light-reflecting member 43, the light-reflecting member 44, and the light-reflecting member 26.

The diffuse reflectances for the light emitted by the light-emitting device 20 of the light-reflecting member 41, the light-reflecting member 43, the light-reflecting member 44, and the light-reflecting member 26 are greater than the diffuse reflectance for the light emitted by the light-emitting device 20 of the light-reflecting member 42.

For the light-reflecting member 41, the light-reflecting member 43, the light-reflecting member 44, and the light-reflecting member 26, the diffuse reflectances are greater than the specular reflectances for the light emitted by the light-emitting device 20. For the light-reflecting member 42, the diffuse reflectance is less than the specular reflectance for the light emitted by the light-emitting device 20.

The content ratio of the light-diffusing material in the light-reflecting member 44 is less than the content ratios of the light-diffusing materials in the light-reflecting member 41, the light-reflecting member 43, and the light-reflecting member 26. Therefore, the transmittance for the light emitted by the light-emitting device 20 of the light-reflecting member 44 is greater than the transmittances for the light emitted by the light-emitting device 20 of the light-reflecting member 41, the light-reflecting member 43, and the light-reflecting member 26.

The light that is emitted upward at the light-emitting device 20 is moderately diffused downward and laterally by the light-reflecting member 44 while being transmitted by the light-reflecting member 44. In other words, the light-reflecting member 44 causes the region directly above the light-emitting device 20 at the light-emitting surface (the first surface 11) of the light-emitting segment 1 to be not too dark and not too bright.

The luminance of the light extracted from the first surface 11, which is the light-emitting surface, can be increased because the light that is emitted from the light-emitting device 20 toward the second surface 12 side is diffusely reflected upward by the light-reflecting member 41.

The light-reflecting member 26 that is provided at the side surface of the light-emitting element 21 suppresses the light entering the light guide plate 10 from the light-emitting element 21 without passing through the fluorescer-including transparent member 22.

The light-reflecting member 41 and the light-reflecting member 26 can suppress the exposure to the light of the light-emitting element 21 of the base 52 of the wiring board 50 at the vicinity of the light-emitting device 20 and prevent the degradation of the base 52.

A portion of the light that is diffusely reflected by the light-reflecting member 41 and/or the light-reflecting member 44 travels toward the first surface 11 and/or the light-reflecting member 42 at the second surface 12 side. The light from the light-emitting device 20 is guided through the light guide plate 10 toward the end portion of the light guide plate 10 while repeating specular reflections at the light-reflecting member 42 and total internal reflections at the first surface 11 in the region between the light-reflecting member 42 and the first surface 11. A portion of the light that travels toward the first surface 11 is extracted outside the light guide plate 10 from the first surface 11.

The light can be easily guided to the end portion (the tilted side surface 14 and the outermost side surface 18) of the light guide plate 10 by using, as the light-reflecting member 42, a substance having higher specular reflection characteristics than diffuse reflection characteristics for the light emitted by the light-emitting device 20. The light is easily guided to the entire region of the light guide plate 10 even when the distance between the light-emitting device 20 and the end portion of the light guide plate 10 and/or the distance between the multiple light-emitting devices 20 are long. The uneven luminance in the light-emitting surface (the first surface 11) can be reduced thereby. Also, the number of the light-emitting devices 20 disposed in the light guide plate 10 may be reduced.

The luminance of the light extracted from the first surface 11 at the end portion of the light guide plate 10 can be increased because the light that is guided to the tilted side surface 14 of the light guide plate 10 can be diffusely reflected toward the first surface 11 by the light-reflecting member 43 provided at the tilted side surface 14.

Also, the light-reflecting member 43 suppresses the light guided between the adjacent light-emitting segments 1. For example, the light that is guided from a light-emitting segment 1 in a light-emitting state to a light-emitting segment 1 in a non-light-emitting state is limited.

According to the embodiment, the light-emitting devices 20 can be disposed with high positional precision with respect to the light guide plate 10 because the light guide plate 10 and the light-emitting devices 20 are configured as a continuous body and the light-emitting devices 20 are held by the light guide plate 10 and not by the wiring board 50. The unevenness of the luminance distribution in the light-emitting surface of the light guide plate 10 is suppressed thereby.

As shown in FIG. 1, the multiple light-emitting segments 1 are arranged in the first direction X and the second direction Y and separated by a gap 100. In other words, the gap 100 that extends in the second direction is formed between the outermost side surfaces 18 of the light guide plates 10 and the side surfaces of the light-reflecting members 43 shown in FIG. 2 for the light-emitting segments 1 adjacent to each other in the first direction X. The gap 100 that extends in the first direction is formed between the outermost side surfaces 18 of the light guide plates 10 and the side surfaces of the light-reflecting members 43 for the light-emitting segments 1 adjacent to each other in the second direction Y. The gap 100 is, for example, 1 mm or less.

The gap 100 between the light-emitting segments 1 permits expansion and contraction of the light guide plates 10 due to the effects of temperature and/or humidity and can prevent the deformation and/or damage of adjacent light guide plates 10 due to one light guide plate 10 pressing on another light guide plate 10.

As shown in FIG. 1, n light-emitting devices 20 are disposed respectively in n regions 90 into which the light guide plate 10 is subdivided when viewed from the first surface 11 side. In the example shown in FIG. 1, n regions 90 are virtually illustrated by uniformly dividing the rectangular light-emitting segment 1 into n (e.g., sixteen) equal portions marked by broken lines in the first direction X and the second direction Y; and one light-emitting device 20 is disposed in each region 90. A center C of each region 90 is illustrated by a point. The center C is positioned at the intersection of two diagonal lines of each rectangular region 90. Or, when the region 90 is a circle, the center C is the center of the circle.

In the embodiment shown in FIG. 1, one light-emitting device 20 is disposed in one region 90. Or, a plurality of light-emitting devices 20 may be disposed in one region 90. For example, when two light-emitting devices 20 are disposed in one region 90, the position of the center of gravity of the straight line connecting the centers of the two light-emitting devices 20 corresponds to the position of one light-emitting device 20 in the present embodiment. When three or more light-emitting devices 20 are disposed in one region 90, the position of the center of gravity of a polygon having the center of each light-emitting device 20 as its apex corresponds to the position of one light-emitting device 20 in the present embodiment.

The light-emitting device 20 is shifted from the center C of the region 90 toward the gap 100 in the regions 90 of the n regions 90 adjacent to the gap 100. The direction of the shift from the center C of the region 90 toward the gap 100 is illustrated by an arrow in FIG. 1 for the light-emitting devices 20 disposed in the regions 90 adjacent to the gap 100. When the gap 100 extends in the first direction X, the direction of the shift from the center C of the region 90 toward the gap 100 is a direction (the second direction Y) perpendicular to the first direction X for the light-emitting devices 20 disposed in the regions 90 adjacent to the gap 100. When the gap 100 extends in the second direction Y, the direction of the shift from the center C of the region 90 toward the gap 100 is a direction (the first direction X) perpendicular to the second direction Y for the light-emitting devices 20 disposed in the regions 90 adjacent to the gap 100.

The light-emitting device 20 is positioned at the center C of the region 90 for the light-emitting devices 20 disposed in the regions 90 not adjacent to either the gap 100 or the outermost side portion of the light-emitting module. In other words, the light-emitting device 20 is positioned at the center C of the region 90 for the light-emitting devices 20 disposed in the regions 90 that are further inward than the regions 90 adjacent to the gap 100 and the regions 90 adjacent to the outermost side portion.

A distance $d_{X1}$ in the first direction X between the centers of the light-emitting devices 20 disposed in the regions 90 adjacent to each other in the first direction X for the inward regions 90 is less than a distance $d_{X2}$ in the first direction X between the center of the light-emitting device 20 disposed in the inward region 90 and the center of the light-emitting device 20 disposed in the region 90 adjacent to the gap 100 (or the outermost side portion) and adjacent to the inward region 90.

Similarly for the second direction Y, a distance $d_{Y1}$ in the second direction Y between the centers of the light-emitting devices 20 disposed in the regions 90 adjacent to each other in the second direction Y for the inward regions 90 is less than a distance $d_{Y2}$ in the second direction Y between the center of the light-emitting device 20 disposed in the inward region 90 and the center of the light-emitting device 20 disposed in the region 90 adjacent to the gap 100 (or the outermost side portion) and adjacent to the inward region 90.

The light guide plate 10 does not exist in the gap 100 between the light-emitting segments 1, and the luminance of the first surface 11, which is the light-emitting surface, above the gap 100 when viewed in plan easily becomes darker than the luminance of the region where the light guide plate 10 exists.

In the embodiment, by shifting the light-emitting devices 20 of the n light-emitting devices 20 that are relatively proximate to the gap 100, i.e., the light-emitting devices 20 disposed in the regions 90 of the n regions 90 adjacent to the gap 100, to be more proximate to the gap 100 than to the center C of the region 90, the decrease of the luminance above the gap 100 in the light-emitting surface can be suppressed, and the uneven luminance in the entire light-emitting surface can be reduced. The light-emitting device 20 may be shifted toward the gap 100 inside the recess 13 shown in FIG. 2, or the light-emitting device 20 may be shifted with the recess 13 toward the gap 100.

When four or more light-emitting segments 1 are arranged in two different directions (the first direction X and the second direction Y) as shown in FIG. 1, an intersection is formed between the gap 100 extending in the first direction X and the gap 100 extending in the second direction Y. Four corner portions 19 of the light guide plates 10 of mutually-different light-emitting segments 1 are adjacent to each other at the intersection of the gaps 100.

The intersection of the gaps 100 also is a region where the light guide plates 10 do not exist and the luminance easily becomes relatively low. In the embodiment, by shifting the light-emitting device 20 from the center C of the region 90 toward the corner portion 19 for the light-emitting devices 20 disposed in the regions 90 of the n regions 90 adjacent to the corner portion 19 of the light guide plate 10 and the gap 100, the decrease of the luminance at the intersection of the gaps 100 can be suppressed, and the uneven luminance in the entire light-emitting surface can be reduced.

Also, in the embodiment, the light-emitting device 20 is shifted from the center C of the region 90 toward the outermost side portion for the light-emitting devices 20 disposed in the regions 90 adjacent to the outermost side portion of the light-emitting module. Among the regions 90 adjacent to the outermost side portion of the light-emitting module, the light-emitting device 20 is shifted toward the corner portion of the light-emitting module for the light-emitting devices 20 disposed in the regions 90 adjacent to the corner portions of the entire light-emitting module. Thereby, the decrease of the luminance at the outer perimeter side of the light-emitting surface of the light-emitting module can be suppressed, and the uneven luminance in the entire light-emitting surface can be reduced.

In one light guide plate 10, the n light-emitting devices 20 are lined up along the first direction X and the second direction Y even when some of the n light-emitting devices 20 are shifted toward the gap 100, the corner portion 19, and/or the outermost side portion. There are no light-emitting devices 20 positioned outside the column of the light-emitting devices 20 along the first direction X or the column of the light-emitting devices 20 along the second direction Y. Uneven luminance due to misalignment of the light-emitting device 20 can be suppressed thereby.

Figure 5:
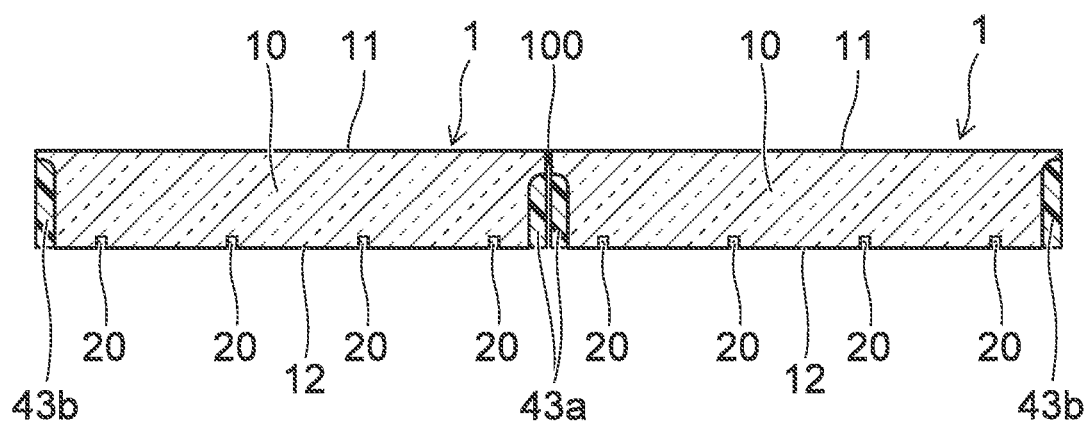
FIG. 5 is a schematic cross-sectional view of a light-emitting module of the embodiment of the present disclosure.

FIG. 5 is a schematic cross-sectional view simply illustrating the configuration of two adjacent light-emitting segments.

One light guide plate 10 includes a first end portion adjacent to another light guide plate 10, and a second end portion not adjacent to another light guide plate 10. The tilted side surface 14 and the outermost side surface 18 described above, which are shown in FIG. 2, are formed at each of the first and second end portions. The light-reflecting members 43 are provided at the first and second end portions.

The light-reflecting member 43 that is provided at the first end portion is taken as a first light-reflecting member 43a in FIG. 5, and the light-reflecting member 43 that is provided at the second end portion is taken as a second light-reflecting member 43b in FIG. 5. The gap 100 exists between the first light-reflecting members 43a provided in the adjacent light guide plates 10.

The height of the upper end of the first light-reflecting member 43a is less than the height of the upper end of the second light-reflecting member 43b. Here, the height refers to the height referenced to the second surface 12 of the light guide plate 10. By setting the height of the upper end of the first light-reflecting member 43a adjacent to the gap 100 to be less than the height of the upper end of the second light-reflecting member 43b not adjacent to the gap 100, the light amount that is guided upward at the gap 100 can be greater than the light amount guided upward at the second light-reflecting member 43b, and the decrease of the luminance above the gap 100 can be suppressed.

Figure 4:
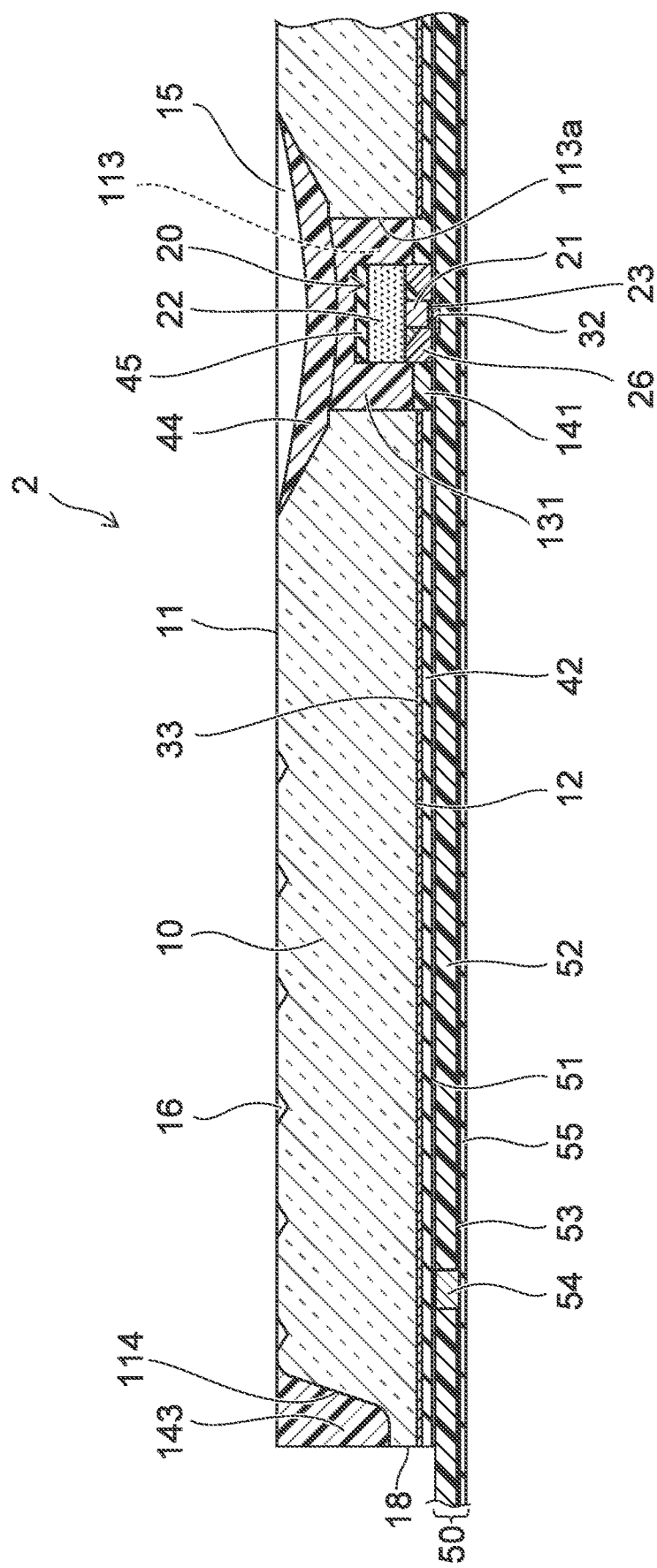
FIG. 4 is an enlarged cross-sectional view similar to FIG. 2, showing another example of a light-emitting module of the embodiment of the present disclosure.

FIG. 4 is an enlarged cross-sectional view similar to FIG. 2, showing another example of the light-emitting segment of the light-emitting module of the embodiment of the present disclosure. The same components as the light-emitting segment 1 described above are marked with the same reference numerals. The light-emitting segment 1 shown in FIGS. 1 and 5 may be replaced with the light-emitting segment 2 shown in FIG. 4.

The light-emitting segment 2 shown in FIG. 4 also includes the light guide plate 10 and the light-emitting device 20. The light guide plate 10 includes a through-portion 113 extending between the first surface 11 and the second surface 12. The light-emitting device 20 is disposed in the through-portion 113.

A light-transmissive member 131 is provided between a sidewall 113a of the through-portion 113 and the side surface of the light-emitting device 20 (the side surface of the transparent member 22 and the side surface of the light-reflecting member 26). The light-emitting device 20 is fixed to the light guide plate 10 by the light-transmissive member 131.

The light-transmissive member 131 is transmissive to the light emitted by the light-emitting device 20 and may include, for example, the same resin as the material of the light guide plate 10 or a resin having a small refractive index difference with the material of the light guide plate 10.

A space such as an air layer or the like is not formed between the light-transmissive member 131 and the side surface of the light-emitting device 20 or between the light-transmissive member 131 and the sidewall 113a of the through-portion 113. Because an air layer is not interposed between the light guide plate 10 and the side surface of the transparent member 22 of the light-emitting device 20, compared to when an air layer is interposed, the refractive index difference between the transparent member 22 and the light guide plate 10 can be smaller, and the input efficiency of the light from the transparent member 22 to the light guide plate 10 can be increased.

The recess 15 is formed at the first surface 11 side at a portion of the light guide plate 10 facing the light-emitting device 20, and the light-reflecting member 44 is provided in the recess 15.

A light-reflecting member 45 is provided at the upper surface of the transparent member 22, which is the upper surface of the light-emitting device 20. The light-transmissive member 131 is provided also between the light-reflecting member 45 and the light-reflecting member 44 to cover the light-reflecting member 45.

A light-reflecting member 141 is provided at the periphery of the light-emitting device 20 at the second surface 12 side of the light guide plate 10. The light-reflecting member 141 is provided below the light-transmissive member 131 and at the side surface of the light-reflecting member 26 of the light-emitting device 20 but is not provided at the side surface of the fluorescer-including transparent member 22. The side surface of the transparent member 22 is covered with the light-transmissive member 131.

The light-reflecting member 42 is provided outward of the light-reflecting member 141 at the second surface 12 of the light guide plate 10. The light-reflecting member 42 is adhered to the second surface 12 by the bonding layer 33.

The light-reflecting member 42 extends to the end of the light guide plate 10. The light-reflecting member 42 is provided at the second surface 12 between the light-reflecting members 141 between the multiple light-emitting devices 20. The boundary between the light-reflecting member 141 and the light-reflecting member 42 is at a position overlapping the light-reflecting member 44 in the thickness direction of the light guide plate 10.

The light guide plate 10 includes a tilted side surface 114 that is tilted with respect to the first and second surfaces 11 and 12. For example, the tilted side surface 114 and the first surface 11 form an obtuse angle. A light-reflecting member 143 is provided at the tilted side surface 114.

The wiring 51 is provided at the lower surface of the light-reflecting member 42, the lower surface of the light-reflecting member 141, and the lower surface of the light-reflecting member 26. The wiring 51 is connected to the electrodes 23 of the light-emitting element 21. The wiring board 50 is bonded to the wiring 51.

The light-reflecting member 141, the light-reflecting member 143, the light-reflecting member 44, the light-reflecting member 45, and the light-reflecting member 26 are, for example, white resin members including light-diffusing materials. The light-reflecting member 141, the light-reflecting member 143, the light-reflecting member 44, the light-reflecting member 45, and the light-reflecting member 26 are, for example, members of a silicone resin or an epoxy resin including titanium oxide as the light-diffusing material. The light-reflecting member 42 is configured similarly to that of the embodiment described above.

The diffuse reflectances for the light emitted by the light-emitting device 20 of the light-reflecting member 141, the light-reflecting member 143, the light-reflecting member 44, the light-reflecting member 45, and the light-reflecting member 26 are greater than the diffuse reflectance for the light emitted by the light-emitting device 20 of the light-reflecting member 42.

For the light-reflecting member 141, the light-reflecting member 143, the light-reflecting member 44, the light-reflecting member 45, and the light-reflecting member 26, the diffuse reflectances are greater than the specular reflectances for the light emitted by the light-emitting device 20.

For the light-reflecting member 42, the diffuse reflectance is less than the specular reflectance for the light emitted by the light-emitting device 20.

The content ratios of the light-diffusing materials in the light-reflecting member 44 and the light-reflecting member 45 are less than the content ratios of the light-diffusing materials in the light-reflecting member 141, the light-reflecting member 143, and the light-reflecting member 26. Therefore, the transmittances for the light emitted by the light-emitting device 20 of the light-reflecting member 44 and the light-reflecting member 45 are greater than the transmittances for the light emitted by the light-emitting device 20 of the light-reflecting member 141, the light-reflecting member 143, and the light-reflecting member 26.

The light that is emitted upward at the light-emitting device 20 is moderately diffused downward and laterally while being transmitted by the light-reflecting member 44 and the light-reflecting member 45. In other words, the light-reflecting member 44 and the light-reflecting member 45 cause the region directly above the light-emitting device 20 at the light-emitting surface (the first surface 11) of the light-emitting segment 2 to be not too dark and not too bright.

The light that is emitted from the light-emitting device 20 toward the second surface 12 side can be diffusely reflected upward by the light-reflecting member 141, and the luminance of the light extracted from the first surface 11, which is the light-emitting surface, can be increased.

The light-reflecting member 141 and the light-reflecting member 26 can suppress the exposure to the light of the light-emitting element 21 of the base 52 of the wiring board 50 at the vicinity of the light-emitting device 20 and prevent the degradation of the base 52.

A portion of the light that is diffusely reflected by the light-reflecting member 141, the light-reflecting member 44, and the light-reflecting member 45 travels toward the light-reflecting member 42 and/or the first surface 11. The light from the light-emitting device 20 is guided through the light guide plate 10 toward the end portion of the light guide plate 10 (the tilted side surface 114 and the outermost side surface 18) while repeating total internal reflections at the first surface 11 and specular reflections at the light-reflecting member 42 in the region between the light-reflecting member 42 and the first surface 11. A portion of the light that travels toward the first surface 11 is extracted outside the light guide plate 10 from the first surface 11.

The light can be easily guided to the end portion of the light guide plate 10 by using, as the light-reflecting member 42, a substance having higher specular reflection characteristics than diffuse reflection characteristics for the light emitted by the light-emitting device 20. The light is easily guided to the entire region of the light guide plate 10 even when the distance between the light-emitting device 20 and the end portion of the light guide plate 10 and/or the distance between the multiple light-emitting devices 20 are long. The uneven luminance in the light-emitting surface (the first surface 11) can be reduced thereby. Also, the number of the light-emitting devices 20 disposed in the light guide plate 10 may be reduced.

The light that is guided to the tilted side surface 114 of the light guide plate 10 can be diffusely reflected toward the first surface 11 by the light-reflecting member 143, and the luminance of the light extracted from the first surface 11 in the end portion region of the light guide plate 10 can be increased.

Also, the light-reflecting member 143 suppresses the light guided between the adjacent light-emitting segments 2. For example, the light that is guided from a light-emitting segment 2 in a light-emitting state to a light-emitting segment 2 in a non-light-emitting state is limited.

Figure 6:
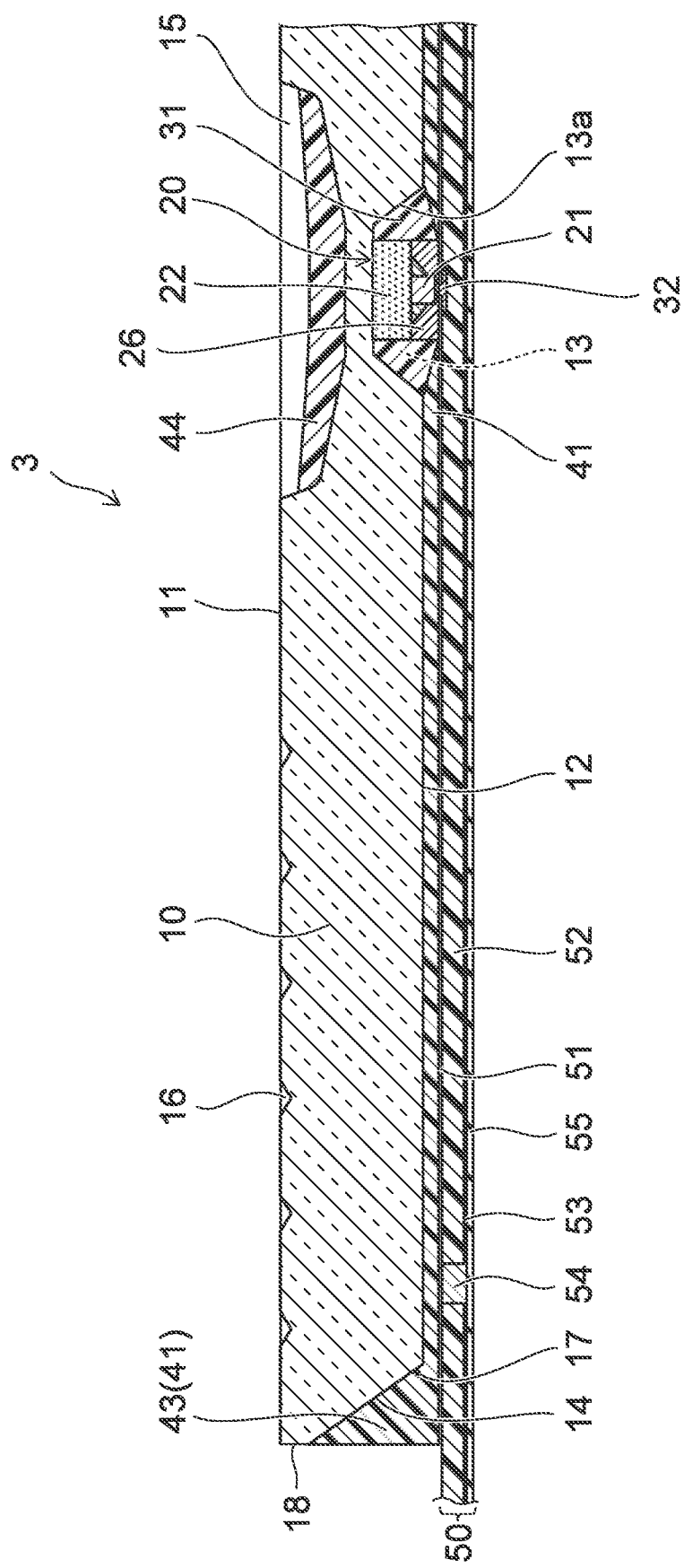
FIG. 6 is an enlarged cross-sectional view similar to FIG. 2, showing still another example of a light-emitting module of the embodiment of the present disclosure.

FIG. 6 is an enlarged cross-sectional view similar to FIG. 2, showing another example of the light-emitting segment of the light-emitting module of the embodiment of the present disclosure. The same components as the light-emitting segment 1 shown in FIG. 2 are marked with the same reference numerals. The light-emitting segment 1 shown in FIGS. 1 and 5 may be replaced with the light-emitting segment 3 shown in FIG. 6.

In the second surface 12 of the light guide plate 10 of the light-emitting segment 3, the light-reflecting member 41 is provided, but the bonding layer 33 and the light-reflecting member 42 of the light-emitting segment 1 shown in FIG. 2 are not provided. The light-reflecting member 41 is formed to have a continuous body with the light-reflecting member 43 provided at the tilted side surface 14 of the light guide plate 10.

The embodiments of the present disclosure have been described with reference to specific examples. However, the present disclosure is not limited to these specific examples. Based on the above-described embodiments of the present disclosure, all embodiments that can be implemented with appropriately design modification by one skilled in the art are also within the scope of the present disclosure as long as the gist of the present disclosure is included. Besides, within the scope of the spirit of the present disclosure, one skilled in the art can conceive various modifications, and the modifications fall within the scope of the present disclosure.

What is claimed is:

1. A light-emitting module, comprising:
   a plurality of light guide plates, each of the plurality of light guide plates including a first surface, a side surface, and a second surface opposite to the first surface, the plurality of light guide plates being separated by a gap between the side surfaces; and
   n light-emitting devices provided at a second surface side of the light guide plate for each of the plurality of light guide plates, n being a natural number of 2 or more, wherein
   the n light-emitting devices are disposed respectively in n regions into which the light guide plate is subdivided when viewed from a first surface side,
   a light-emitting device of the plurality of light guide plates disposed in a region of the n regions adjacent to the gap is shifted toward the gap from a center of the region adjacent to the gap,
   the plurality of light guide plates include a light guide plate having a first side surface adjacent to an other light guide plate and a second side surface not adjacent to an other light guide plate,
   a first light-reflecting member is provided at the first side surface,
   a second light-reflecting member is provided at the second side surface, and
   a height of an upper end of the first light-reflecting member is less than a height of an upper end of the second light-reflecting member.

2. The light-emitting module according to claim 1, wherein
   the n light-emitting devices include a light-emitting device disposed in a region of the n regions not adjacent to the gap, and
   the light-emitting device disposed in the region not adjacent to the gap is positioned at a center of the region not adjacent to the gap.

3. The light-emitting module according to claim 1, wherein the plurality of light guide plates are arranged in a first direction and in a second direction orthogonal to the first direction, the gap extends in the first direction, and a direction of the shift of the light-emitting device disposed in the region adjacent to the gap is the second direction.

4. The light-emitting module according to claim 1, wherein the plurality of light guide plates are arranged in a first direction and in a second direction orthogonal to the first direction, a direction of the shift of a light-emitting device of the n light-emitting devices disposed in the region adjacent to the gap is the second direction when the gap extends in the first direction, and a direction of the shift of a light-emitting device of the n light-emitting devices disposed in the region adjacent to the gap is the first direction when the gap extends in the second direction.

5. The light-emitting module according to claim 1, wherein a light-emitting device of the n light-emitting devices disposed in a region of the n regions adjacent to the gap and adjacent to a corner portion of the light guide plate is shifted toward the corner portion from a center of the region adjacent to the gap and the corner portion.

6. The light-emitting module according to claim 1, wherein the n light-emitting devices are lined up in a first direction and in a second direction orthogonal to the first direction.

* * * * *